United States Patent [19]

Bergmann et al.

[11] Patent Number: 5,476,290
[45] Date of Patent: Dec. 19, 1995

[54] PLUG-IN SOCKET JOINT SECURED AGAINST SLIDING MOVEMENT

[75] Inventors: Karl-Heinz Bergmann, Hösbach; Manfred Vorbeck, Laufach, both of Germany; Alain Percebois, Blenod les Pont-a-Mousson, France

[73] Assignee: Eisenwerke Fried.Wilh.Duker GmbH & Co., Karlstadt, Germany

[21] Appl. No.: 282,262

[22] Filed: Jul. 29, 1994

[30] Foreign Application Priority Data

Aug. 2, 1993 [DE] Germany .............................. 9311500 U

[51] Int. Cl.⁶ ...................................................... F16L 21/06
[52] U.S. Cl. .......................... 285/110; 285/322; 285/351; 285/374
[58] Field of Search ...................................... 285/374, 322, 285/323, 231, 232, 110, 351

[56] References Cited

U.S. PATENT DOCUMENTS

| | | | |
|---|---|---|---|
| 4,229,025 | 10/1980 | Volgstadt et al. | 285/105 |
| 4,641,858 | 2/1987 | Roux | 285/231 X |
| 4,805,932 | 2/1989 | Imhof et al. | 285/232 X |
| 5,067,751 | 11/1991 | Walworth et al. | 285/374 X |
| 5,297,824 | 3/1994 | Imhof et al. | 285/374 X |
| 5,297,826 | 3/1994 | Percebois et al. | 285/374 X |

FOREIGN PATENT DOCUMENTS

| | | |
|---|---|---|
| 0247214 | 12/1987 | European Pat. Off. . |
| 0537711 | 4/1993 | European Pat. Off. . |
| 3232221 | 3/1984 | Germany . |
| 2041476 | 9/1980 | United Kingdom . |

*Primary Examiner*—Dave W. Arola
*Attorney, Agent, or Firm*—Jacobson, Price, Holman & Stern

[57] ABSTRACT

The plug-in socket joint secured against sliding movement is intended for socket pipes (1) manufactured by centrifugal casting, in which the spigot end (3) of one pipe may be inserted with radial play into the socket end (2) of the other pipe. In this joint, a sealing ring (8) and a clamping ring (14) structurally separate therefrom are arranged, said clamping ring being composed of a plurality of clamping segments (15) spaced from one another in peripheral direction. The latter have a spherical outer shell surface (17), are connected to each other in peripheral direction by means of a moulded-on intermediate layer of rubber or similar and each have a toothing (19) on their inner surface (18). A holding part (20), which may be fixed in the area of the socket face end and supporting same, is formed on the clamping ring (14) and comprises a connecting section (24) extending to the clamping ring (14) and tapering approximately conically, and may be expanded together with the clamping ring (14) in dependence on the outer dimensions of the spigot end (3) to be inserted and may thus be extended in axial direction. To prevent the toothing (19) of the clamping segments (15) from corroding as a result of penetrating moisture and oxygen, the connecting section (24) is provided in its area extending from the clamping ring (14) with the clamping segments (15) to the holding part (20) with at least one ring-shaped sealing edge (34) protruding radially inwards and elastically enclosing the spigot end of the inserted pipe.

8 Claims, 3 Drawing Sheets

5,476,290

PLUG-IN SOCKET JOINT SECURED AGAINST SLIDING MOVEMENT

The invention relates to a plug-in socket joint secured against sliding movement, in particular for mouldings and for socket pipes manufactured by centrifugal casting, in which the spigot end of one pipe may be inserted with radial play into the socket end of the other pipe, in which a sealing ring and a clamping ring structurally separate therefrom are arranged, said clamping ring being composed of a plurality of clamping segments spaced from one another in peripheral direction, said clamping segments having a spherical outer shell surface, being connected to each other in peripheral direction by means of a moulded-on intermediate layer of rubber or similar and each having a toothing on their inner surface, which presses radially against the spigot end on generation of axial forces as a result of interaction of the spherical shell surface with an inner surface of the pipe socket tapering conically to its end, wherein a holding part, which may be fixed in the area of the socket face end supporting same and having a ring-disc-shaped section composed of elastomer material, is formed on the clamping ring, said ring-disc-shaped section having a higher flexural strength because of its reinforced structure and comprising a connecting section extending to the clamping ring and tapering approximately conically, and may be expanded together with the clamping ring in dependence on the outer dimensions of the spigot end to be inserted and may thus be extended in axial direction, and wherein a recess area adapted to the cross-section of the reinforced ring-disc-shaped section is provided in the area of the socket face end.

In a known plug-in socket joint of this type (DE-OS 41 34 089) it has been shown that moisture and oxygen can penetrate through the ring-shaped gap between the connecting section extending from the face end of the socket to the clamping ring and the spigot end of the adjoining pipe inserted into the socket end and can reach the clamping segments of the clamping ring. In particular in the case where pipes are laid in heavily acidic or heavily alkaline soils, this can cause adverse chemical reactions at the clamping segments, i.e. may cause corrosion in particular in the area of the toothing and thus have a detrimental effect on strength.

It has now been revealed that this risk may be counteracted in a simple manner by the measure that in its area extending from the clamping ring with the clamping segments to the holding part, the connecting section has at least one ring-shaped sealing edge protruding radially inwards and elastically enclosing the spigot end of the inserted pipe. After the spigot end of one pipe has been inserted into the socket end of the adjoining pipe, the sealing edge elastically enclosing the spigot end ensures that the annular gap is closed, thus preventing any aggressive moisture or oxygen from penetrating to the clamping segments.

In a further embodiment of the invention, the effectiveness of the sealing edge may be substantially increased, in particular with respect to possible high dimensional tolerances between the pipes to be connected in the sealing edge, by the measure that on the outside of the connecting section, the sealing edge is associated with an annular ring, which protrudes outwards and increases the elastic flexibility of the sealing edge, and to accommodate said annular ring and secure it in position when the socket joint is in coupled position, a peripheral recess is formed in the area of the socket end.

If the peripheral recess has an approximately semi-circular cross-section, the elastically flexible load on the sealing edge is further advantaged. This effect may be additionally enhanced if the annular ring comprises two or several ribs directed radially outwards and extending parallel to one another, of which the axially outer ribs extend to elastically abut against the peripheral recess. Namely, the lateral load on the axially outer ribs of the annular ring engaging in the semi-circular peripheral recess favours the elastic load on the sealing edge in radial direction, since the central section of the annular ring can also be displaced radially in the peripheral recess.

It has proved to be of great advantage from the functional aspect if the width of the sealing edge is smaller in the area of its base than the width of the annular ring associated on the outside with the sealing edge in the area of its base and thus the width of the peripheral recess.

In a modified arrangement of the plug-in socket joint according to the invention, it has proved to be advantageous if the annular ring is provided with a radial gap for insertion of a steel ring to increase the flexural strength, and if the sealing edge is formed on the side of the annular ring bordering the gap and facing the face end of the socket. This arrangement is particularly advantageous in plug-in socket joints secured against sliding movement for larger pipe diameters with a rated width (NW) of NW 600 or NW 1000, in which an inserted steel ring assures that the clamping ring is securely in position prior to and during assembly and ensures that the clamping ring cannot loosen on its own accord and collapse. In this case, the sealing edge also ensures that no aggressive moisture can reach the clamping segments or the steel ring. This sealing function is further promoted if both the peripheral recess and the annular ring have an approximately rectangular cross-section and if the sealing edge projecting radially from the annular ring is provided in the form of a lip.

Further details, advantages and features may be seen from the following description on the basis of the attached drawing. Reference is expressly made to said drawing for disclosure of all those details not described in the text.

Figure 1:
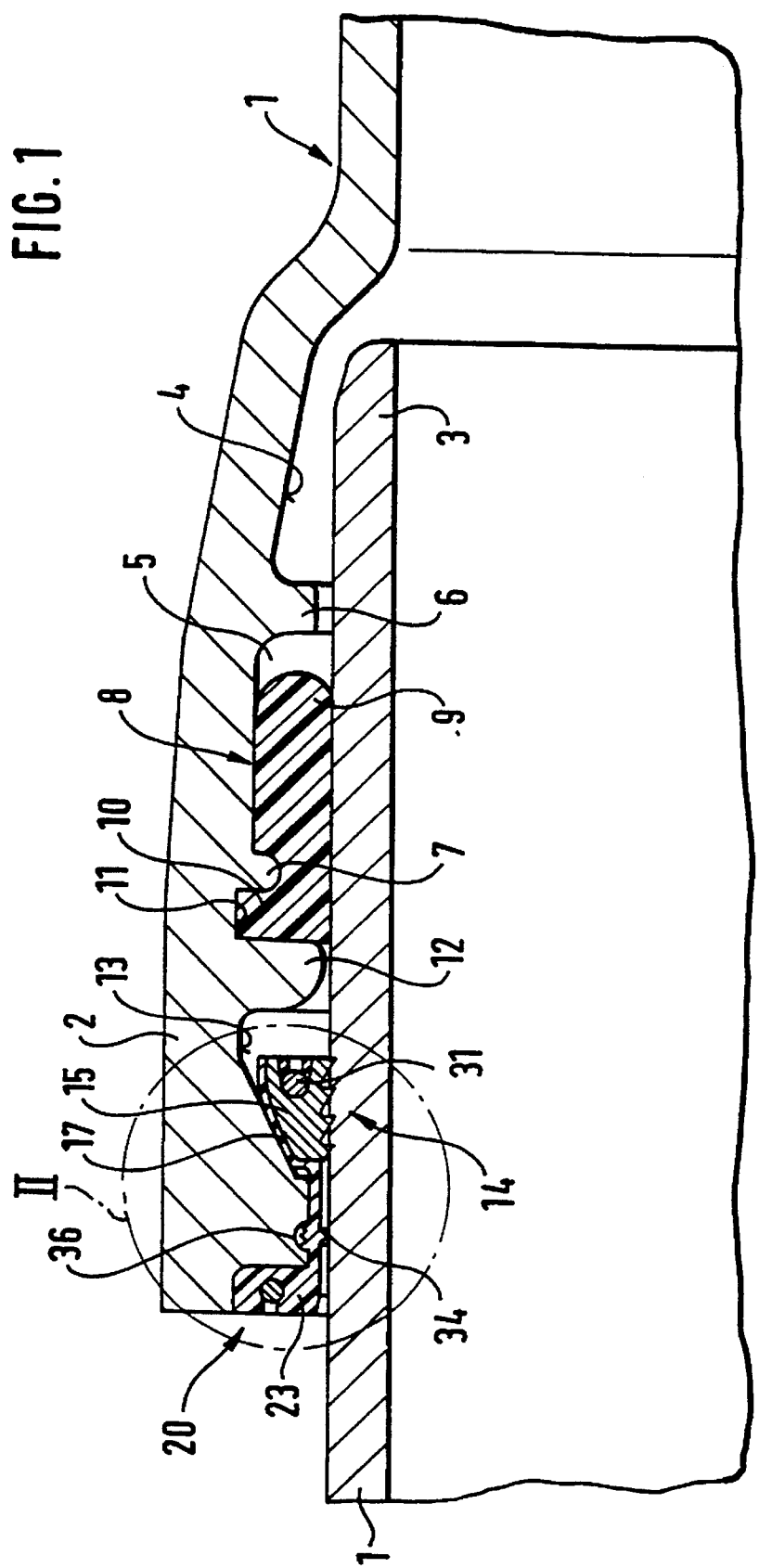
FIG. 1 shows a section through the spigot end of a pipe with the socket end of the adjoining pipe drawn over it.

As can be seen from the drawing, the socket pipe 1 has a socket at one of its ends—the socket end 2—, into which the spigot end 3 of an adjoining pipe 1 may be inserted with radial play. A recess 4 is provided on the inside of the socket to permit relative swivel movement of the pipe 1 within specific limits. Connecting to this recess, a sealing chamber 5 is formed, which is bordered at one end by a radially extending inside shoulder 6 of the socket end 2. An annular ring 7 runs at a distance from the inside shoulder 6 in the vicinity of the sealing chamber 5. This annular ring 7 securely positions a sealing ring 8, which has a head section 9 of softer elastomer material and a base section 10 of harder elastomer material. This base section 10 is located in an annular groove 11 bordered on one side by the annular ring 7 and on the other side by a supporting shoulder 12, which at the same time borders the other end of the sealing chamber 5. The sealing ring 8 is fixed in position in this way and maintains this illustrated position even when the spigot end 3 is inserted into the socket end 2 on deformation of the head section 9. A locking chamber 13 is located between the support shoulder 12 and the face end of the socket end 2 to receive a clamping ring 14. This clamping ring 14 comprises a plurality of clamping segments 15 spaced from one another in peripheral direction. The clamping segments 15 are connected to one another by means of a moulded-on intermediate layer of rubber or similar, which is not shown in the drawing. On their side facing the locking chamber 13, the clamping segments 15 each have a spherical outer shell surface 17. This interacts with an inner surface 18 of the pipe socket which tapers conically to its end, that is, it presses a tooth arrangement 19 provided on each inner surface of the clamping segments 15 radially against the spigot end 3 when axial forces are generated.

As may be seen from FIG. 1, a holding part 20 made of elastomer material, which may be fixed at the face end of the socket and supporting it, is formed on the clamping ring 14. This holding part 20 comprises a ring-disc-shaped section 23 abutting against the face 22 of the socket. In the shown example, a connecting section 24 is provided which extends from the inside edge of the socket face to the clamping ring 14 and tapers approximately conically when in unstressed state. This section 24 extends from the ring-disc-shaped section 23, which is of particularly thick construction and has a higher flexural strength. The connecting section 24 may be expanded together with the clamping ring 14 in dependence on the outside dimensions of the spigot end 3 to be inserted, and may thus be extended in axial direction to ultimately achieve the expanded form shown in the drawing.

It may also be seen from the drawing that the connecting section 24 of the holding part 20 is provided on the spherical shell surface 17 of the clamping ring 14 facing the conically tapering inside surface 18 of the socket end with an insulating coating 25 to electrically insulate the interconnected pipes from one another. This coating 25 may be formed by an enamel layer or by a plastic layer reinforced with fibreglass.

As may be seen from the drawing, the socket face 22 has a recess area 27 at its inside edge which is matched to the cross-section of the reinforced ring-disc-shaped section 23. These measures help assure that the holding part 20 of the clamping ring with its clamping segments 15 abuts against the inside surface 13 of the socket, above all in the case of plug-in socket joints for high rated widths, both prior to and during insertion of the spigot end of the pipe into the socket. This is assisted by the increased flexural strength as a result of the reinforced structure of the section 23 with an approximately rectangular cross-section. In this case, the recess area of the socket face is formed by a stepped arrangement 27 on the inside edge.

In the case of units comprising holding part and clamping ring for socket pipes with very high rated widths, a steel ring 28 increasing the flexural strength is provided for the reinforced ring-disc-shaped section 23 of the holding part. An axial gap 29 is provided in section 23 for this steel ring 28, through which gap the steel ring may be inserted and removed, as required. The holding arrangement in this case is favoured by selection of a width of the insertion gap 29, which is smaller in dimension than the diameter of the steel ring 28.

Figure 2:
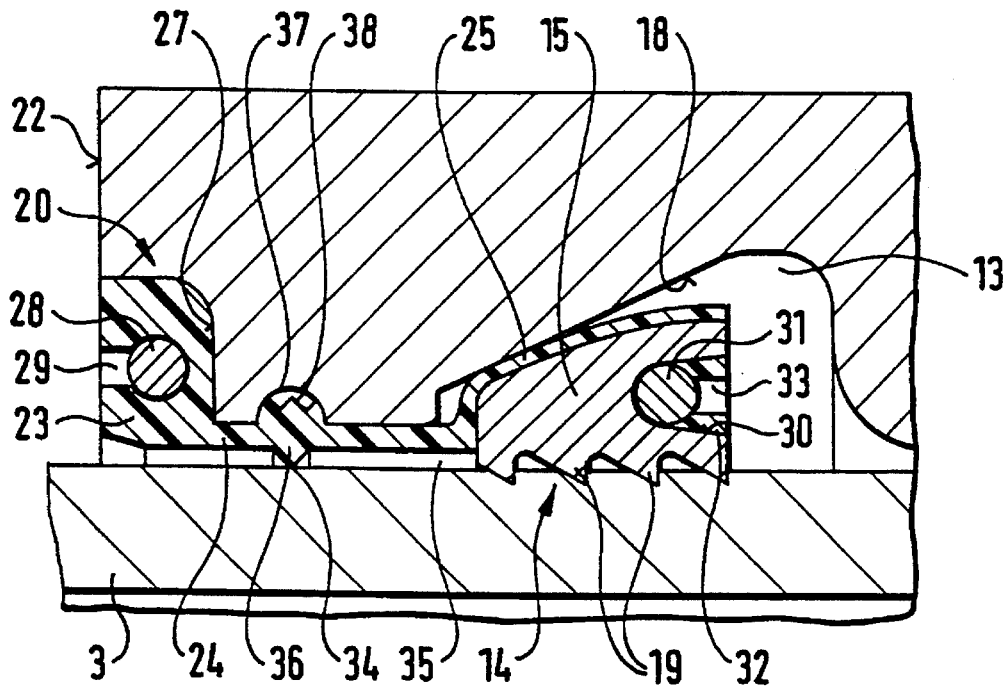
FIG. 2 shows a cut-out section from FIG. 1, on an enlarged scale, illustrating a first embodiment of the arrangement according to the invention.
Figure 3:
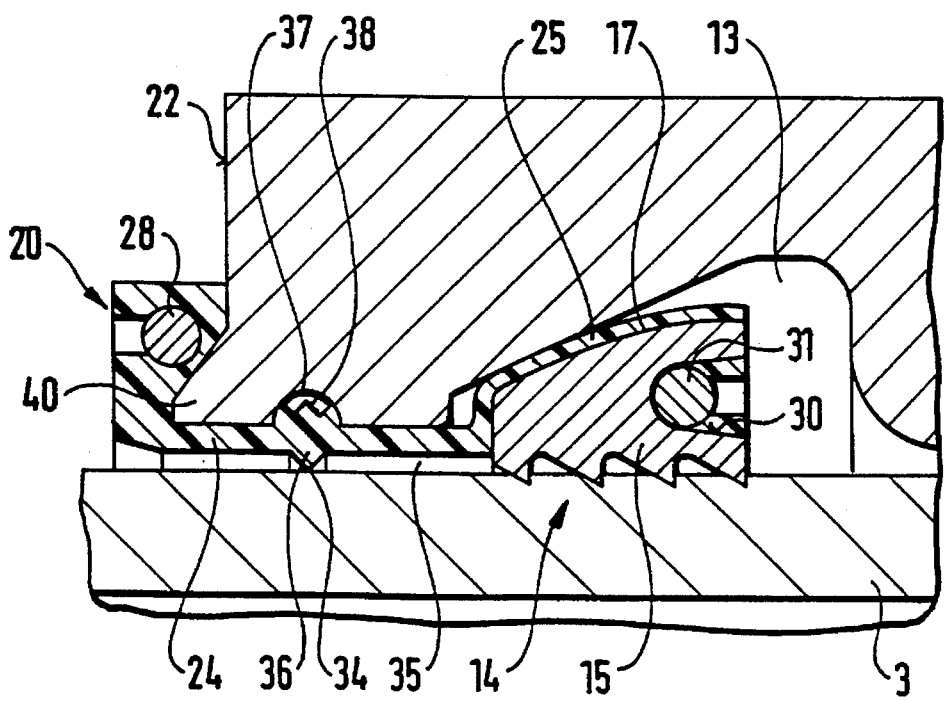
FIG. 3 shows a sectional view corresponding to FIG. 2 illustrating a second embodiment.
Figure 4:
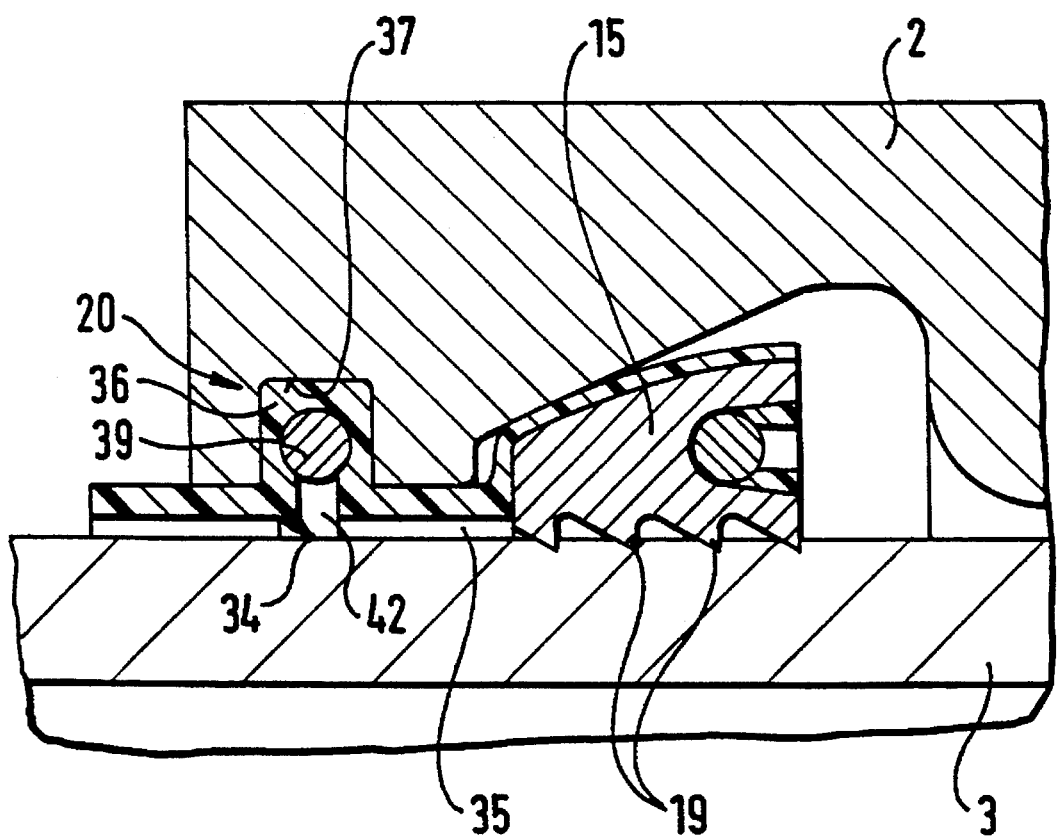
FIG. 4 shows a sectional view illustrating a third embodiment.

As FIGS. 2 to 4 show in particular, the clamping ring 14 with clamping segments 15 and the moulded-on intermediate layer joining the latter in peripheral direction is provided on its rear side averted from the socket face 22 with a peripheral recess 30 to receive a rigid support ring 31 preferably made of steel. For this purpose, a holding ring 32 made of elastomer material securing the support ring 31 is fixed in the peripheral recess 30 in the shown arrangement.

The peripheral recess 30 of the clamping ring 14 is open in axial direction and contains a holding ring 32 fixed therein with an axial insertion gap 33 for the support ring 31. The width of this insertion gap 33 is smaller in dimension that the diameter of the support ring 31.

As may be seen, the connecting section 24 has a ring-shaped sealing edge 34 protruding radially inwards on its area extending from the clamping ring 14 with the clamping segments 15 to the holding part 20. This sealing edge 34 elastically encloses the spigot end 3 of the inserted pipe 1, thus preventing moisture and oxygen from entering through the ring-shaped gap 35 between the connecting section 24 and the spigot end 3 and reaching the clamping segments 15 of the clamping ring 14. On the outside of the connecting section 24, an outwardly protruding annular ring 36, which increases the elastic flexibility of the sealing edge 34, is provided for the sealing edge 34. A peripheral recess 37 is provided in the area of the socket end 2 to receive the annular ring 36.

In the embodiment according to FIG. 2 or 3, this peripheral recess 37 has an approximately semi-circular cross-section. In the shown arrangement, the annular ring 36 comprises three parallel ribs 38 bordering a cavity above the annular ring with the peripheral recess 37. The axially outer ribs 38 abut against the oblique walls of the peripheral recess 37 to form an elastic seal, preventing moisture from penetrating into the chamber and thus providing corrosion protection for the clamping segments 15. The central section with the central ribs 38 can be elastically deformed into the cavity, thus assisting the elastic abutment of the sealing edge 34 against the spigot end 3 of the pipe 1. FIG. 2 or 3 show that the width of the sealing edge 34 is smaller in the area of its base than the width of the annular ring 36 allocated to the sealing edge 34 on the outside in the area of its base and thus the width of the peripheral recess 37.

In the modified arrangement shown in FIG. 4, the annular ring 36 is provided with a radial gap 42 for insertion of a steel ring 39 increasing the flexural strength. In this arrangement, the sealing edge 34 is provided on the side of the annular ring 36 bordering the gap and facing the socket face 22 to ensure that no moisture or oxygen entering from the outside can reach the steel ring 39 or the toothing 19 of the clamping segments 15. As shown, in this embodiment both the peripheral recess 37 and the annular ring 36 have an approximately rectangular cross-section. The sealing edge 34 projecting radially from the annular ring 36 is provided in the form of a lip in the embodiment to assure elastic deformability. In this embodiment, it is assured that the annular ring 36 supporting the sealing edge 34 with its inserted steel ring 39 at the same time assumes the function of the holding part 20 abutting the socket face 22 provided in the embodiment according to FIGS. 2 and 3. Whilst the holding part 20 in the embodiment according to FIG. 2 corresponds to the state of the art, the holding part 20 in the embodiment according to FIG. 3 is formed in such a way that it engages underneath a radially inner conical socket edge 40 projecting on the face side, which results in more secure positioning of the clamping ring 14 prior to assembly, in particular in the case of higher rated widths of pipes to be joined, and permits a shorter socket construction in spite of the provision of the peripheral recess 37, since the distance of the inner surface 13 of the socket from the socket face 22 may thus be reduced.

We claim:

1. A plug-in socket joint including a pipe with a socket end and a pipe with a spigot end secured against relation sliding movement, in particular for moulded parts and for socket pipes manufactured by centrifugal casting, in which said spigot end of one pipe is adapted for insertion with radial play into said socket end of the other pipe, in which a sealing ring and a clamping ring structurally separate therefrom are arranged, said spigot end including an inner surface tapering conically towards the end of the pipe socket, said clamping ring being composed of a plurality of clamping segments spaced from one another in a peripheral direction, said clamping segments having a curved outer shell surface, being connected to each other in said peripheral direction by means of a moulded-on intermediate layer of rubber and each having at least one tooth on an inner surface, which presses radially against said spigot end on generation of axial forces as a result of interaction of said curved shell surface with said surface of the pipe socket tapering conically to an end of the pipe socket, wherein a holding part, which is fixed in the area of said socket face end and which supports said holding part and having an annular disc-shaped section composed of elastomer material, said annular disc-shaped section having a reinforced structure which provides a higher flexural strength and comprising a connecting section extending to said clamping ring and tapering approximately conically in an unstressed state, and being expandable together said clamping ring in dependence on the outer dimensions of said spigot end to be inserted and thus being extendable in an axial direction, and wherein a recess area comforming to the cross-section of said annular disc-shaped section is provided in the area of said socket face end receiving said disk-shaped section thereby providing said support, wherein said connecting section extends from the clamping ring with the clamping segments to the holding part, has at least one ring-shaped sealing edge protruding radially inwards and elastically enclosing said spigot end of said inserted pipe.

2. The plug-in socket joint according to claim 1, wherein on said outside of the connecting section, said sealing edge is associated with an annular ring which protrudes radially outward, and to accommodate said annular ring and secure said annular ring in position when the socket joint is in coupled position, a peripheral recess is formed in the area of the socket end.

3. The plug-in socket joint according to claim 2, wherein said peripheral recess has an approximately semi-circular cross-section.

4. The plug-in socket joint according to claim 2, wherein said annular ring comprises at least two ribs directed radially outward and extending parallel to one another, of which the axially outer ribs extend to elastically abut against said peripheral recess.

5. The plug-in socket joint according to claim 2 wherein the width of said sealing edge has a base which is smaller than the width of said annular ring associated on the outside with the base of the sealing edge and thus the width of the peripheral recess.

6. The plug-in socket joint according to claim 1 wherein said annular ring is provided with a radial gap for insertion of a steel ring to increase the flexural strength, and said the sealing edge is formed on said side of said annular ring bordering said gap and facing said face end of the socket.

7. The plug-in socket joint according to claim 6 wherein both said peripheral recess and said annular ring have an approximately rectangular cross-section, and that said sealing edge projecting radially from said annular ring is provided in the form of a lip.

8. The plug-in socket joint according to claim 1 wherein the socket end comprises a radially inner socket edge having a conical shape, which projects on the face side over the socket face lying in a plane oblique to the pipe axis and extending over the holding part.

* * * * *